United States Patent
Dan et al.

(10) Patent No.: US 12,403,405 B2
(45) Date of Patent: Sep. 2, 2025

(54) GAME PACKET DELIVERY METHOD AND GAME PACKET DELIVERY SYSTEM

(71) Applicant: ASUSTeK COMPUTER INC., Taipei (TW)

(72) Inventors: Ten-Long Dan, Taipei (TW);
Wei-Sheng Teng, Taipei (TW);
Ching-Chuan Chiu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 413 days.

(21) Appl. No.: 17/979,732

(22) Filed: Nov. 2, 2022

(65) Prior Publication Data

US 2024/0024785 A1    Jan. 25, 2024

(30) Foreign Application Priority Data

Jul. 22, 2022 (CN) .......................... 202210870558.X

(51) Int. Cl.
*A63F 13/352* (2014.01)
*A63F 13/77* (2014.01)

(52) U.S. Cl.
CPC ............ *A63F 13/77* (2014.09); *A63F 13/352* (2014.09); *A63F 2300/513* (2013.01); *A63F 2300/552* (2013.01)

(58) Field of Classification Search
None
See application file for complete search history.

(56) References Cited

U.S. PATENT DOCUMENTS

| | | | |
|---|---|---|---|
| 8,681,656 B2* | 3/2014 | Sulc | H04W 40/38 370/254 |
| 2013/0184073 A1* | 7/2013 | Uchiyama | A63F 13/49 463/29 |
| 2018/0309664 A1* | 10/2018 | Balasubramanian | H04L 47/6255 |
| 2023/0042916 A1* | 2/2023 | Sole | G06Q 20/123 |
| 2023/0140933 A1* | 5/2023 | Gittleson | A63F 13/73 705/65 |
| 2024/0050861 A1* | 2/2024 | Choi | A63F 13/795 |

FOREIGN PATENT DOCUMENTS

| CN | 112153155 | 12/2020 |
|---|---|---|
| CN | 112583712 | 3/2021 |

* cited by examiner

*Primary Examiner* — Jay Trent Liddle
(74) *Attorney, Agent, or Firm* — JCIPRNET

(57) ABSTRACT

A game packet delivery method and a game packet delivery system are provided. The method includes executing a game program by a user device; and transmitting at least one game packet related to the game program between the user device and a game server via a telecom server and a shared router in response to the execution of the game program. The shared router belongs to a decentralized network node, and the transmission of at least one game packet does not involve any server provided by cloud service providers. Therefore, the efficiency of transferring game packets between the user device and the game server can be improved, thereby improving the game experience of the end user. Besides, because the transmission of game packets does not go through the backbone network of the cloud service providers, it can also ensure the privacy of online games for users.

11 Claims, 4 Drawing Sheets

GAME PACKET DELIVERY METHOD AND GAME PACKET DELIVERY SYSTEM

CROSS-REFERENCE TO RELATED APPLICATION

This application claims the priority benefit of China application serial no. 202210870558.X, filed on Jul. 22, 2022. The entirety of the above-mentioned patent application is hereby incorporated by reference herein and made a part of this specification.

BACKGROUND

Technical Field

The disclosure relates to a game packet delivery method and a game packet delivery system.

Description of Related Art

The world's largest cloud service providers include Amazon Web Services (AWS), Microsoft Azure and Google Cloud Platform. The large backbone networks set up by these cloud service providers can provide a variety of modular cloud services, including cloud computing, data storage, and online transactions. By charging users, most web application services can be completed through the cloud platforms provided by these cloud service providers. However, for some types of applications (such as online games) that need to transmit information quickly, such a large backbone network will inevitably cause delays in information transmission, which affects the operation experience of end users.

SUMMARY

According to the first aspect of this disclosure, a game packet delivery method is provided. The method includes executing a game program by a user device; and transmitting at least one game packet related to the game program between the user device and a game server via a telecom server and a shared router in response to the execution of the game program. Wherein the shared router belongs to a decentralized network node, and the transmission of at least one game packet does not involve any server provided by cloud service providers.

According to the second aspect of this disclosure, a game packet delivery system is provided. The system includes a user device and a shared router. The user device is configured to execute a game program. The shared router is connected to the user device. The shared router is configured to cooperate with a telecom server to transmit at least one game packet related to the game program between the user device and a game server in response to the execution of the game program. The shared router belongs to a decentralized network node. The transmission of at least one game packet does not involve any server provided by cloud service providers.

Based on the above, when the user device executes the game program, at least one game packet related to the game program can be transmitted between the user device and the game server via the telecom server and the shared router. In particular, the shared routers belong to decentralized network nodes, and the transmission of the game packets does not involve any servers provided by cloud service providers. Therefore, by avoiding the backbone network prone to packet transmission delay, the efficiency of transmitting game packets between the user device and the game server can be improved, thereby improving the game experience of the end user. Besides, because the transmission of game packets does not go through the backbone network of the cloud service providers, it can also ensure the privacy of online games for users.

DESCRIPTION OF THE EMBODIMENTS

Figure 1:
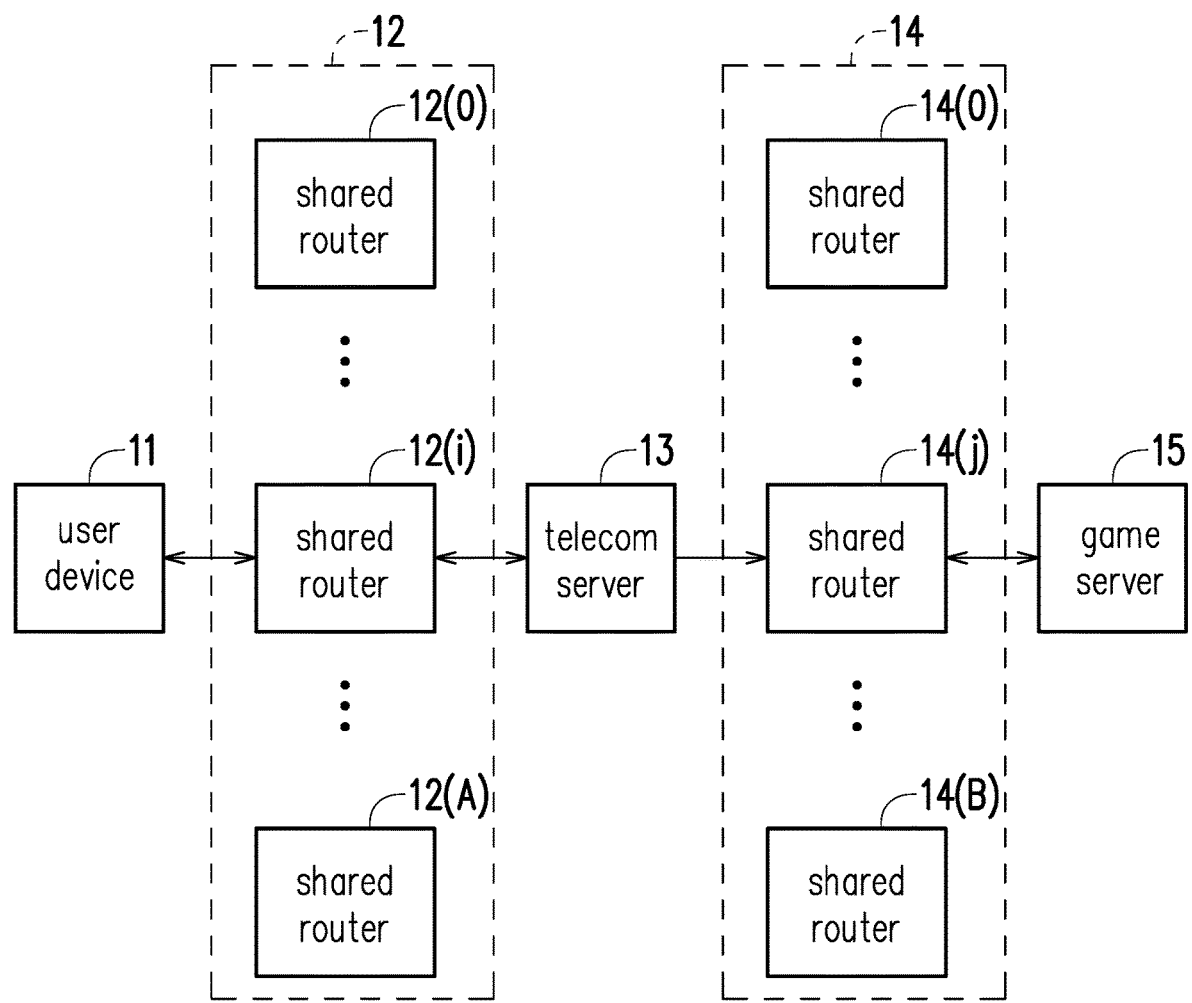
FIG. 1 is a schematic diagram of a game packet delivery system according to an embodiment of the application.

Reference will now be made in detail to the exemplary embodiments of the invention, examples of which are illustrated in the accompanying drawings. Wherever possible, the same reference numerals are used in the drawings and description to refer to the same or like parts.

Referring to FIG. 1, the game packet delivery system 10 includes a user device 11, a router group 12, a telecom server 13, a router group 14, and a game server 15.

The user device 11 may include a smart phone, a tablet computer, a notebook computer, a desktop computer, an industrial computer or a game console (set) and other electronic devices with functions of information display, information processing and information transmission, and the type of the user device 11 is not limited thereto. In particular, the user device 11 may have a networking function. For example, the user device 11 may be connected to the Internet via a wired and/or wireless network interface card.

The router group 12 may include routers 12(0)~12(A). The routers 12(0)~12(A) can be used to transmit network packets between user device 11 and telecom server 13. The total number of the routers 12(0)~12(A) can be one or more, which is not limited in this case.

The telecom server 13 may include servers provided by telecom operators around the world. The telecom server 13 can be used to provide local network basic services. For example, well-known telecom operators in China include China Mobile, China Telecom and China Unicom, etc. For another example, well-known telecom providers in the United States include AT&T and Verizon, etc. The total number of telecom servers 13 can be one or more, which is not limited in this case.

The router group 14 may include routers 14(0)~14(B). The routers 14(0)~14(B) can be used to transmit network packets between the telecom server 13 and the game server 15. The total number of the routers 14(0)~14(B) can be one or more, which is not limited in this case. In an embodiment, the router group 12 and the router group 14 can also be combined into the same router group.

The game server 15 may include a server provided by a game operator. The game server 15 can be used to store game data associated with one or more game programs. In addition, game server 15 may provide a game access interface. Multiple players (or multiple user devices 11) can perform online game interaction through the game access interface provided by the game server 15.

The user device 11 may execute the game program. The game package program includes the game program of online game (also known as network game). In response to the execution of the game program, the user device 11 may generate at least one game packet related to the game program. For example, in the process of executing the game program on the user device 11, the generated game packet can continuously reflect the execution status of the game program. 任 user device 11. For example, the game package may contain game data related to the game program executed by the user device 11. The user device 11 can communicate with the game server 15 (and other players) via the game packets (or game data). In addition, the game server 15 can also transmit game packets related to the game program to the user device 11.

On the other hand, in response to the execution of the game program, at least one router in the router group 12 and/or 14 may cooperate with the telecom server 13 to transmit the game packets between the user device 11 and the game server 15. For example, when the user device 11 executes the game program, the user device 11 can connect to the router 12(i) via the wireless local area network (e.g. Wifi) provided by the router 12(i). Next, the game packet generated by the user device 11 executing the game program can be transmitted to the telecom server 13 via the router 12(i), and then transmitted to the game server 15 via the router 14(j).

In an embodiment, the router 14(j) can also replace the router 12(i) and is responsible for transmitting game packets between the user device 11 and the telecom server 13 and between the telecom server 13 and the game server 15. The router 12(i) may include any one of routers 12(0)~12(A). The router 14(j) may include any one of routers 14(0)~14(B). In addition, the total number of routers 12(i) and 14(j) may be one or more respectively, which is not limited in this case.

It should be noted that, each router in the router groups 12 and 14 is a decentralized network node. Compared with centralized network nodes (that is, the routing rules of routers for network packets are uniformly determined by the control host or control node), each router in router groups 12 and 14 can determine the routing rules for network packets by itself. Therefore, there is no need to be under the control of a control host or a control node. In an embodiment, each router in the router groups 12 and 14 is also called a shared router or a shared server.

In an embodiment, in the process of passing (e.g., routing) game packets from user device 11 to game server 15 and/or from game server 15 (e.g., routing) to user device 11, the transmission of the game packets does not involve any servers provided by cloud service providers such as Amazon Web Services (AWS), Microsoft Azure and Google Cloud Platform. That is, in the process of delivering (e.g. routing) game packets, the game packets do not pass through the servers provided by the above or similar cloud service providers.

From another point of view, in an embodiment, one or more servers provided by the above or similar cloud service providers may be ignored (e.g. bypassed) in the process of transmitting (e.g. routing) game packets. By ignoring (e.g. bypassing) one or more servers provided by the above or similar cloud service providers, the efficiency of transferring game packets between the user device and the game server can be improved, thereby improving the end user's gaming experience. Besides, because the transmission of game packets does not go through the backbone network of the cloud service providers (i.e., the server provided by the cloud service provider), it can also ensure the privacy of online games for users.

In an embodiment, both the routers 12(i) and 14(j) include a blockchain router. That is, the routers 12(i) and 14(j) themselves can perform blockchain operations. For example, the routers 12(i) and 14(j) can execute programs such as calculation (i.e., mining) of virtual currency or cryptocurrency such as Bitcoin. In an embodiment, the routers 12(i) and 14(j) may belong to the same blockchain network.

Figure 2:
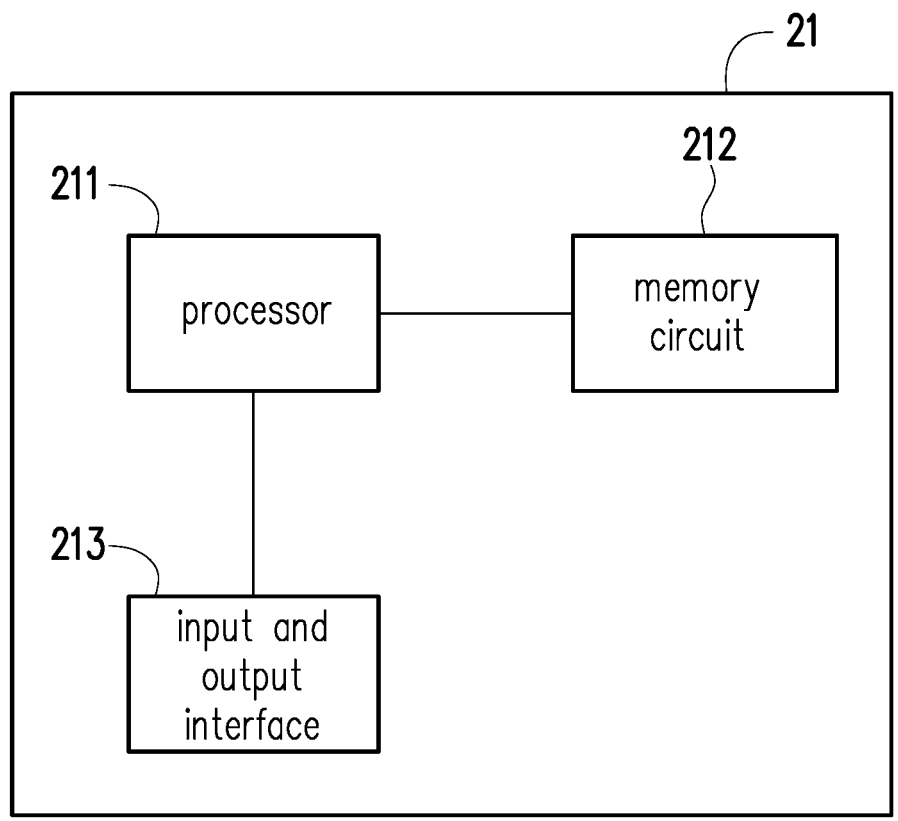
FIG. 2 is a schematic diagram of a shared router according to an embodiment of the application.

Referring to FIG. 1 and FIG. 2, the router 21 may be used to represent routers 12(i) and/or 14(j).

The router 21 includes a processor 211, a memory circuit 212, and a input and output (I/O) interface 213. The processor 211 is responsible for the whole or part of the operation of the router 21. For example, the processor 211 may include a central processing unit (CPU), a graphics processing unit (GPU), or other programmable general-purpose or special-purpose microprocessors, a digital signal processors (DSP), a programmable controller, Application Specific Integrated Circuit (ASIC), Programmable Logic Device (PLD), or other similar devices or combinations of these devices.

The memory circuit 212 is used for storing data. For example, the memory circuit 212 may include a volatile memory circuit and a non-volatile memory circuit. The volatile memory circuit is used to store data volatilely. For example, the volatile storage circuit may include random access memory (RAM) or similar volatile storage media. The non-volatile memory circuit is used to store data non-volatilely. For example, the non-volatile storage circuit may include Read Only Memory (ROM), Solid State Disk (SSD), Hard Disk Drive (HDD), or similar non-volatile storage media.

The I/O interface 213 may include various signal output/output devices, such as a communication circuit (for example, a network interface card), a mouse, a keyboard, a screen, a touch screen, a speaker and/or a microphone. The device type of I/O interface 213 is not limited in this case.

In an embodiment, under the decentralized architecture, the processor 211 can calculate routing information according to a header information of the received game packets. For example, the routing information can reflect the shortest, fastest and/or best packet delivery path between the router 21 and the game server 15. The processor 211 can transmit the game packets according to the routing information.

In an embodiment, the header information of the game packets may contain the Internet's source Internet Protocol address, target IP address, source communication port and target communication port. The processor 211 can query a topology information according to the header information of the game packet and decide which router to transmit the game packet to according to the query result, or directly transmit the game packet to the user device 11 or the game server 15. The topology information can be stored in the memory circuit 212.

In an embodiment, under the decentralized architecture, the processor 211 may update the topology information according to the topology changes of the decentralized network where the router 21 is located. For example, in response to a new node (i.e. router) being added to the decentralized network where router 21 is located or an old node (i.e. router) being removed from the decentralized network where router 21 is located, the processor 211 may update the topology information. The updated topology information may reflect the latest topology of the decentralized network where router 21 is located.

In an embodiment, the processor 211 may share the updated information of the topology information to other nodes (i.e. routers) in the same decentralized network, so that the other nodes (i.e., routers) in the same decentralized network may synchronously update the topology information maintained by themselves. Besides, in an embodiment, the processor 211 may receive updated information of the topology information from other nodes (i.e., routers) in the same decentralized network. Then, the processor 211 may update the topology information according to the update information.

In an embodiment, the processor 211 may calculate the routing information through a deep learning model or an artificial intelligence model. For example, the deep learning model or the artificial intelligence model can use various prediction models or algorithms such as convolutional neural networks (CNN), which are not limited in this case. The deep learning model or the artificial intelligence model can be trained to predict the shortest, fastest and/or best packet delivery paths for transmitting the game packets.

In an embodiment, in response to the router 21 assisting in transmitting the game packets, the processor 211 may provide rewards to the online account associated with the router 21 via a reward program. For example, according to the system resources (such as time, network bandwidth and/or power consumption) used by the router 21 to assist in transmitting the game packets, the reward program may execute a reward redemption mechanism to provide rewards to an online account associated with the router 21. For example, the rewards may include a specified amount of virtual currency (or cryptocurrency), free Wi-Fi connection time that can be used in certain connection environments, free Wi-Fi connection bandwidth or free virtual private network (VPN) can be used in specific connection environments, etc., as a feedback for the router 21 to assist in transmitting the game packets. For example, the reward program may be stored in memory circuit 212.

In an embodiment, the reward program may record information that the router 21 assists in transmitting the game packets and report the information to a remote server (also known as a reward server). The remote server (also known as a reward server) may provide corresponding rewards to the online account associated with the router 21 according to the information reported by the reward program.

Figure 3:
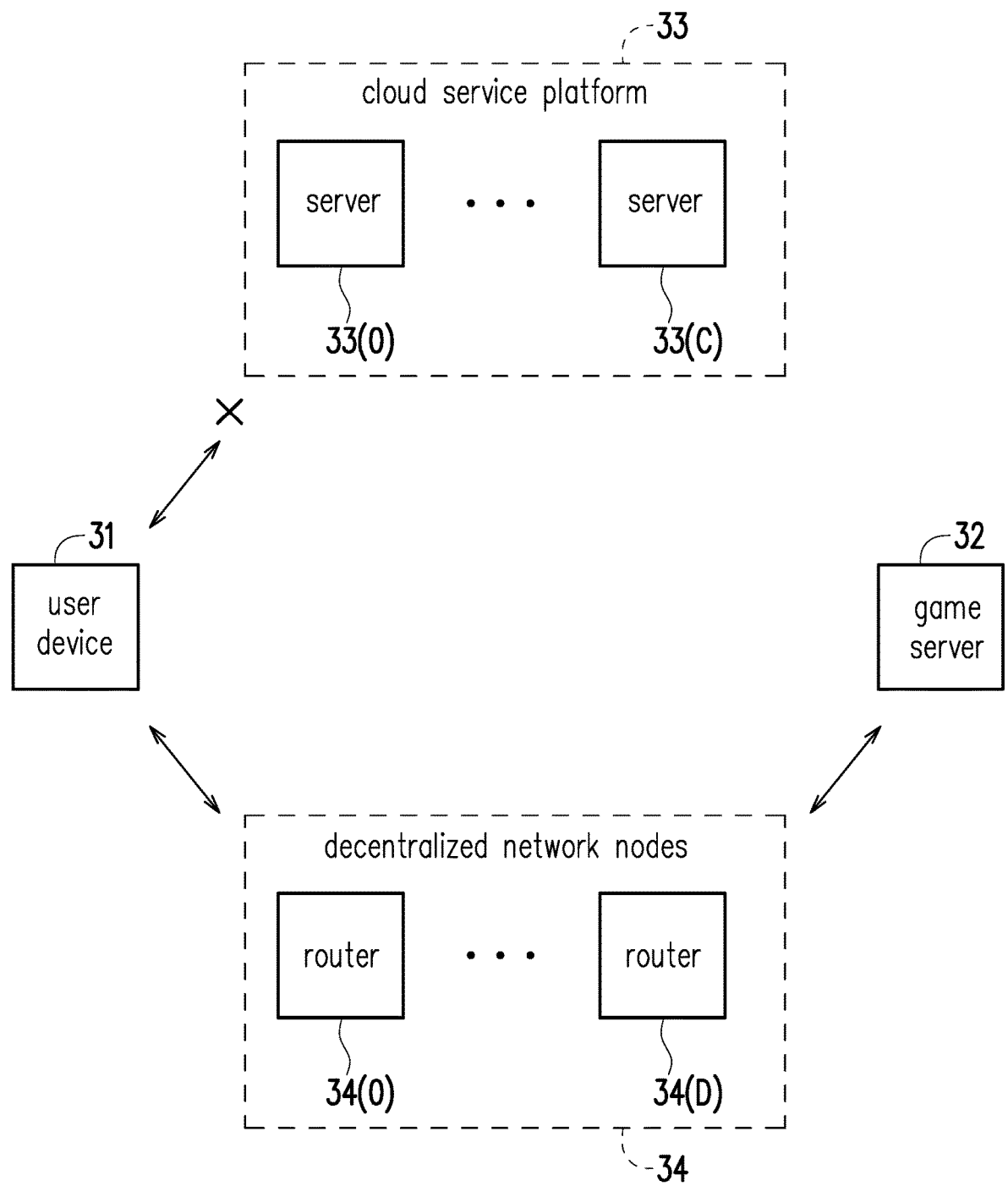
FIG. 3 is a schematic diagram of transmitting game packets according to an embodiment of the application.

Referring to FIG. 3, it is assumed that a user device 31 includes the user device 11 of FIG. 1, and a game server 32 includes the game server 15 of FIG. 1.

In the process of transmitting the game packet, the user device 31 may ignore (e.g. bypass) the servers 33(0)~33(C) provided by the cloud service provider (or cloud service platform) 33, and transmit the game packet to the game server 32 through the routers 34(0)~34(D) belonging to the decentralized network node 34. Similarly, the game server 32 may also ignore (e.g. bypass) the servers 33(0)~33(C) provided by the cloud service provider (or cloud service platform) 33, and transmit the game packet to the user device 31 through the routers 34(0)~34(D) belonging to the decentralized network node 34. In addition, the router 34(0) ~34(D) may belong to the same blockchain network.

Figure 4:
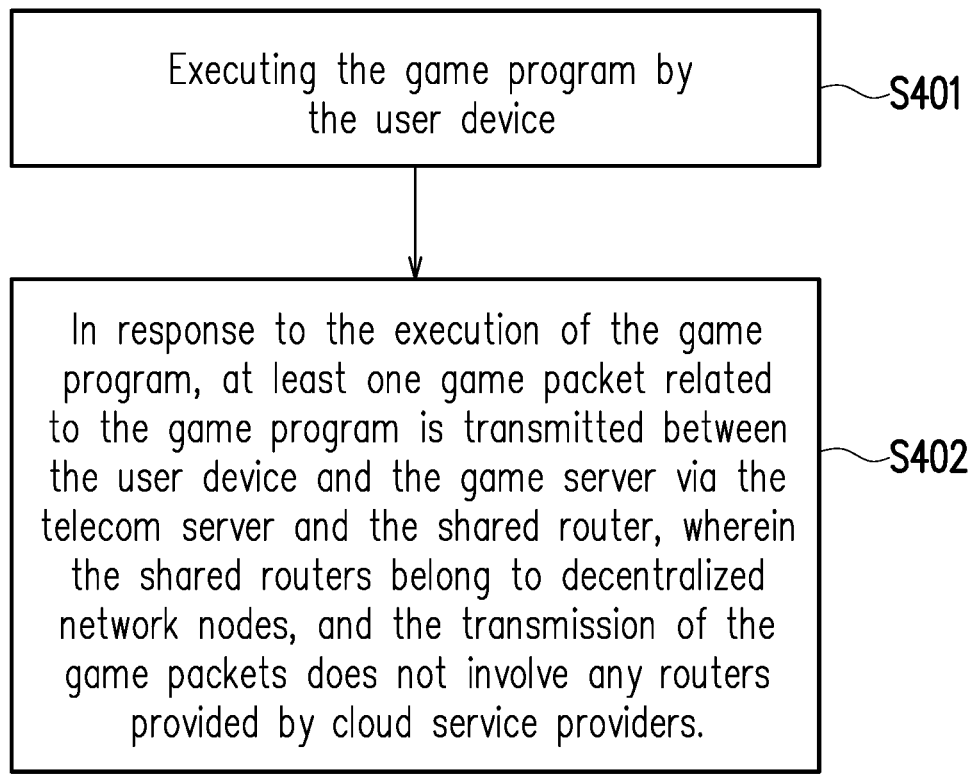
FIG. 4 is a flowchart of a game packet delivery method according to an embodiment of the application.

Referring to FIG. 4, in step S401, the game program is executed by the user device. In step S402, in response to the execution of the game program, at least one game packet related to the game program is transmitted between the user device and the game server via the telecom server and the shared router. In particular, the shared routers belong to decentralized network nodes, and the transmission of the game packets does not involve any routers provided by cloud service providers.

However, each step in FIG. 4 has been described in detail above, and will not be repeated here. It is worth noting that each step in FIG. 4 can be implemented as multiple codes or circuits, which is not limited in this case. The method can be used in conjunction with the above exemplary embodiments, or can be used alone, and is not limited in this case.

In summary, the embodiment can ignore (e.g. bypass) the servers provided by the cloud service provider and use the shared router that is a decentralized network node to transmit game packets between the user device and the game server. Therefore, the transmission efficiency of game packets can be effectively improved. Besides, because the transmission of game packets does not go through the backbone network of the cloud service providers (i.e., the server provided by the cloud service provider), it can also ensure the privacy of online games for users.

It should be noted that at last: above each embodiment is only in order to illustrate technical scheme of the invention, rather than its limitation. Although the invention has been described in detail with reference to the foregoing embodiments, those of ordinary skill in the art should understand that the technical solutions described in the foregoing embodiments can still be modified, or some or all of the technical features thereof can be equivalently replaced. And these modifications or replacements do not make the essence of the corresponding technical solutions depart from the scope of the technical solutions of the embodiments of the invention.

What is claimed is:

1. A game packet delivery method comprising:
executing a game program by a user device; and
transmitting at least one game packet related to the game program between the user device and a game server via a telecom server and a shared router in response to the execution of the game program,
wherein the shared router belongs to a decentralized network node, and
the transmission of at least one game packet does not involve any server provided by cloud service providers,
providing rewards to online accounts associated with the shared router in response to the shared router assisting in transmitting the at least one game packet.

2. The game packet delivery method according to claim 1, wherein the shared router comprises a blockchain router.

3. The game packet delivery method according to claim 2, wherein the blockchain router comprises a first blockchain router and a second blockchain router, and the first blockchain router and the second blockchain router belong to the same blockchain network.

4. The game packet delivery method according to claim 1, wherein the step of transmitting the at least one game packet related to the game program between the user device and the game server via the telecom server and the shared router comprises:
ignoring the server provided by the cloud service providers in the process of transmitting the at least one game packet.

5. The game packet delivery method according to claim 1, wherein the step of transmitting the at least one game packet related to the game program between the user device and the game server via the telecom server and the shared router comprises:

calculating a routing information by the shared router according to a header information of the at least one game packet under a decentralized architecture; and transmitting the at least one game packet by the shared router according to the routing information.

6. A game packet delivery system comprising:

a user device, configured to execute a game program; and a shared router, connected to the user device, wherein the shared router is configured to cooperate with a telecom server to transmit at least one game packet related to the game program between the user device and a game server in response to the execution of the game program, wherein the operation of transmitting the at least one game packet related to the game program between the user device and the game server by the shared router in conjunction with the telecom server comprises:

the server provided by the cloud service providers are ignored in the process of transmitting the at least one game packet, the shared router belongs to a decentralized network node, and the transmission of at least one game packet does not involve any server provided by cloud service providers.

7. The game packet delivery system according to claim 6, wherein the shared router comprises a blockchain router.

8. The game packet delivery system according to claim 7, wherein the blockchain router comprises a first blockchain router and a second blockchain router, and the first blockchain router and the second blockchain router belong to the same blockchain network.

9. The game packet delivery system according to claim 6, wherein the shared router is further configured to provide rewards to online accounts associated with the shared router in response to the shared router assisting in transmitting the at least one game packet.

10. The game packet delivery system according to claim 6, wherein the operation of transmitting the at least one game packet related to the game program between the user device and the game server by the shared router in conjunction with the telecom server comprises:

a routing information is calculated by the shared router according to a header information of the at least one game packet under a decentralized architecture; and the at least one game packet is transmitted by the shared router according to the routing information.

11. A game packet delivery method comprising:

executing a game program by a user device; and transmitting at least one game packet related to the game program between the user device and a game server via a telecom server and a shared router in response to the execution of the game program, wherein the step of transmitting the at least one game packet related to the game program between the user device and the game server via the telecom server and the shared router comprises:

calculating a routing information by the shared router according to a header information of the at least one game packet under a decentralized architecture; and transmitting the at least one game packet by the shared router according to the routing information, wherein the shared router belongs to a decentralized network node, and the transmission of at least one game packet does not involve any server provided by cloud service providers.

* * * * *